Patented July 5, 1938

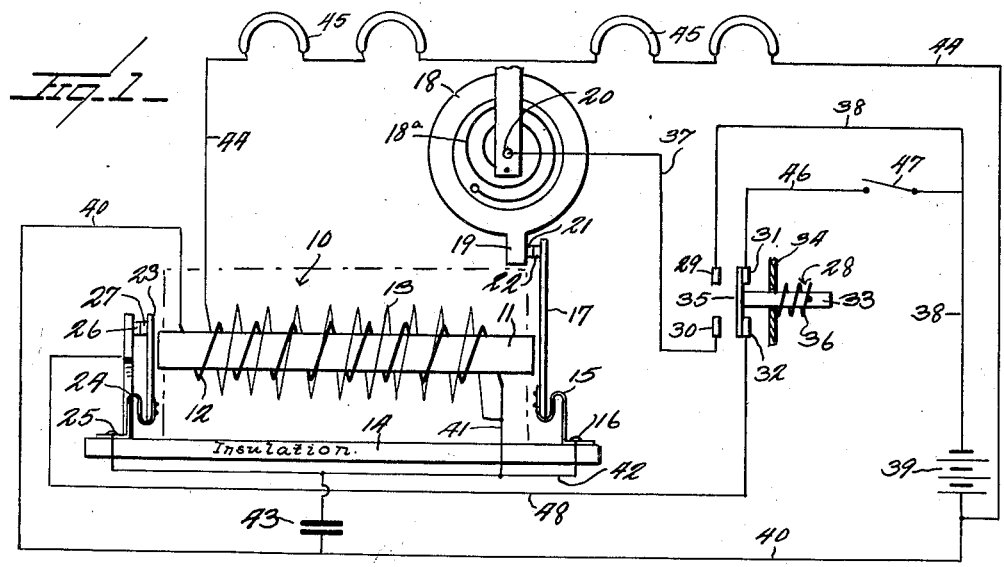

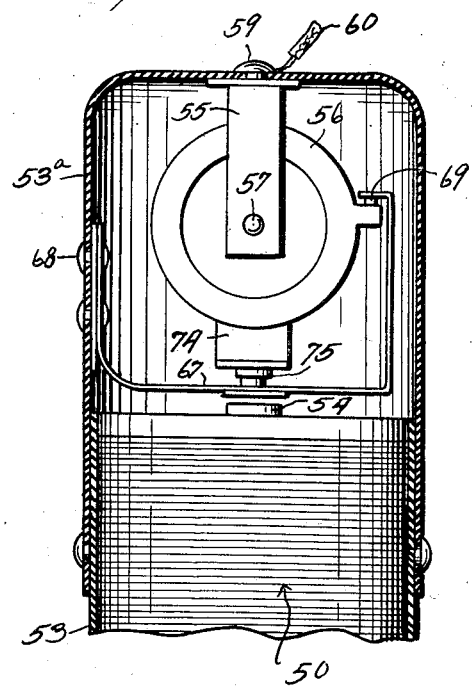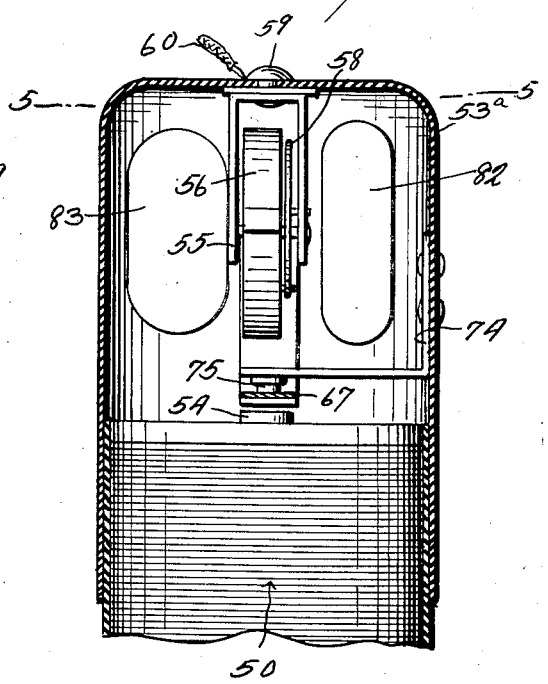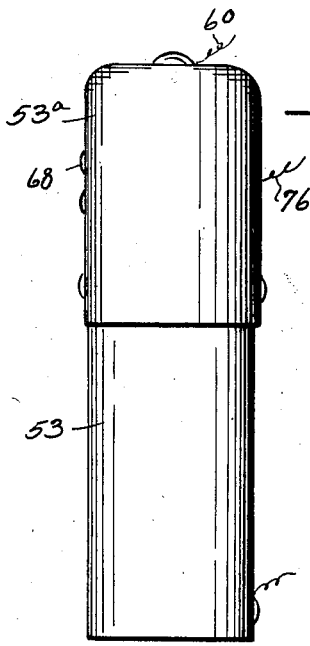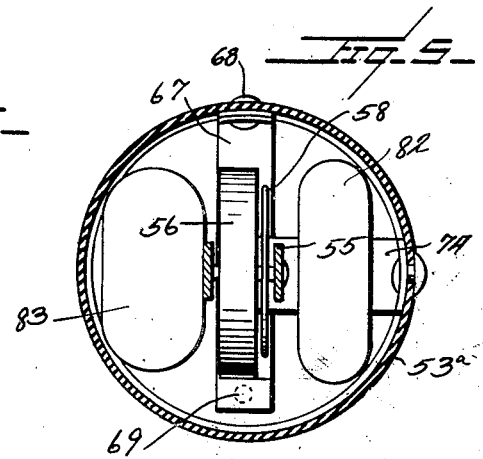

2,122,847

UNITED STATES PATENT OFFICE 2,122,847

COMBINED CONTINUOUS AND INTERMITTENT FLASHING MECHANISM FOR NEON LAMPS

Owen M. Shattuck, South Zanesville, and Murl E. Fulk, Zanesville, Ohio

Application February 25, 1936, Serial No. 65,700

6 Claims. (Cl. 177—329)

This invention relates to means for energizing neon lamps and lamps of kindred character, and particularly to means for energizing neon lamps used on vehicles as signalling lamps. It is usual and required by law in many states that heavy trucks and buses used in interstate commerce or on long hauls shall be provided with parti-colored lamps as well as with the usual headlights, tail lights and stop signal lights. These lamps, while sufficient during the period when the truck is actually travelling, provide no automatically actuated safeguard when the truck has been stopped, either intentionally or through an accident, because while the lamps may continue to be energized when the truck stops, yet they do not show positively to any oncoming vehicles that the truck has stopped. Furthermore, such ordinary and usual lamps may go out by reason of a short circuit or by reason of battery exhaustion, thus leaving no other means to warn oncoming trucks than the use of flares or signal lanterns. The placing of flares or signal lanterns a hundred feet or so rearward and forward of the truck is a nuisance to the drivers and, therefore, oftentimes neglected. Of course, trucks of this character might be equipped with danger indicating electric lamps which would be automatically energized when the truck comes to a stop, but these trucks consume so much power for the ordinary running lamps that generators frequently burn out and no signalling system will be used that requires more power to be expended than is required for the ordinary commonly used lamps. Furthermore, these ordinary electric lamps do not have any very great light penetration in case of fog, heavy snow or the like atmospheric conditions.

It is the object of this present invention to provide a signalling means for trucks, buses and other motor vehicles, which includes the use of one or more neon signal lamps so energized as to flash at short intervals when the truck has come to a standstill, but remain practically continuously energized or at least give the effect of continued energization when the truck is moving.

A further object is to provide means for energizing said lamps which will use but very little electric potential.

A further object is to provide a device of the character stated which will operate automatically to cause the current pulsations to be so rapidly fed to the lamp that the neon lamp appears to be continuously lighted, that is, so that a practically continuous light will be given out when the vehicle is running and to automatically intermittently flash the signal lamp when the truck has come to a standstill and the brake is applied.

A still further object is to provide means whereby it is possible to produce either an intermittent or practically continuous current through the secondary circuit of an induction coil into which a neon lamp or lamps is disposed by the use of certain switches and mechanism; as will be hereinafter described.

Other objects will appear in the course of the following description.

Our invention is illustrated in the accompanying drawings wherein:—

Figure 1 is a diagrammatic view of one form of our combination flasher and continuous energizer;

Figure 2 is a diagrammatic view of another form of our invention operating on the same principle;

Figure 3 is a fragmentary vertical section through the casing showing a portion of the induction coil and the flashing and continuous lighting mechanism;

Figure 4 is a like view to Figure 3 but at right angles thereto;

Figure 5 is a section on the line 5—5 of Figure 4; and

Figure 6 is an elevation of the casing for the induction coil and flashing mechanism.

Referring to Figure 1, 10 designates generally an induction coil including a core 11, a primary winding 12 and a secondary winding 13. This coil is mounted upon an insulating base 14. Mounted upon one end of said base adjacent one end of the induction coil is a leaf spring 15 which is attached by a binding screw 16 to the base 14 at one end and at the other end is connected to and resiliently supports an armature 17. Associated with the free end of the armature is an oscillating wheel 18 having thereon a lug 19. This wheel is normally urged to a position with its lug in contact with the armature by means of a spring 18a, the wheel of course being mounted upon a shaft or axle 20 supported in any suitable manner from the base. The wheel is metallic and the lug is metallic and is provided with a contact point 21 coacting with the contact point 22 on the armature. The spring 18a exerts such force against the armature as to hold it away from the extremity of the core 11.

At the opposite end of the induction coil there is disposed a second armature 23 which is supported by means of a leaf spring 24 upon the base 14 being connected thereto by a binding screw 25. The armature coacts with a metallic member or support 26 mounted upon the base and provided with a breaker point or contact 27 against which the armature 23 is urged by the resilience of the spring 24.

Disposed at any convenient location is a switch designated generally 28 which in one position coacts with a pair of contacts 29 and 30 and in another position coacts with a pair of contacts 31 and 32. This switch comprises a stem 33 which extends through a support 34 and carries upon its extremity the metallic bridge 35. A spring 36 urges the switch in a direction to carry its bridge 35 into electrical engagement with the contacts 31 and 32, but when the switch is manually forced inward, as for instance, by the application of the brake or the release of the clutch, the bridge 35 will engage the contacts 29 and 30.

From the contact 30 extends a conductor 37 to the axle of the wheel 20, this axle being metallically connected with the lug 19. From the associated contact 29 a conductor 38 extends to a battery 39 or other source of potential. From the other side of this battery a conductor 40 leads to one end of the primary coil 12. From the other end of this primary a conductor 41 leads to a conductor 42 which at one end is connected to the binding screw 16 and at the other is connected to the binding screw 25. A condenser 43 is connected across the wires 42 and 40.

With the wiring and mechanism above described, it follows that when the switch 28 is shifted to carry the bridge 35 into engagement with the contacts 29 and 30, that current will flow from the battery 39 along the wire 38 across the bridge 35 to contact 30, then by wire 37 to the axle of wheel 18, through this wheel to the lug 19, thence to the armature 17, the spring 15, the binding screw 16, wire 42 by wire 41 to the primary coil 12, then back by wire 40 to the battery 39. The secondary coil 13 is connected by the conductor 44 to a series of neon tubes 45 and this conductor 44 connects with the conductor 40 and thus to the battery 39. The other end of the secondary is connected to the conductor 41 which leads from the primary coil to the conductor 42. Thus it will be seen that when the bridge 35 has closed the gap between the contacts 29 and 30, that current will pass from the source of potential 39 to contact 29 across the bridging contact 35 to contact 30, thence to wheel 18 through the contacting lugs 21 and 22 to armature 17, thence to spring 15, thence by wires 42 and 41 to the primary coil and thence by return wire 40 to the battery. This energizes this primary coil and draws the armature 17 against the core 30. This will give a kick to the wheel 18, causing the wheel to turn in a clockwise direction in Figure 1 and to swing in this direction as far as the spring 18a will permit. The moment that the contacts 21 and 22 between the armature and the wheel are broken, current ceases to flow through the primary coil and the armature 17 returns to its initial position. As soon, however, as the contacts 21 and 22 have again engaged with each other, the circuit through the primary coil will be again closed, the armature 17 will be again attracted, and the operation will be repeated. This intermittent closing and opening of the circuit through the primary coil will cause current to be induced in the secondary coil in the well known manner and this will cause the lamps 45 to be flashed each time that the circuit is made and broken. This induced current will flow from the secondary coil 13 through wire 44, through the lamps 45 to wire 40, thence through the condenser 43 and wires 42 and 41 back to the secondary coil 13.

The contact 31 is connected by a conductor 46 to manually operable switch 47 and thence to the conductor 38, and thus to one side of the battery or other source of potential 39. The contact 32 is connected by a conductor 48 to the metallic support 26. Under normal circumstances, the bridge 35 of the switch 28 is in engagement with the contacts 31 and 32. Under these circumstances, current passes from the battery 39 to conductor 46, assuming that the switch 47 is closed, thence to the bridge 35, thence to conductor 48, thence to the support 26 through the contact 27 to the armature 23, thence by way of the spring 24 to the conductor 42, and thence by wire 41 to the primary of the induction coil and back by wire 40 to the battery 39. Under these circumstances, current will pass from the battery to wire 48, to armature 23 and by wire 42 through the primary coil and back to the battery. This will energize the core 11, causing the attraction of the armature 23, and the moment that the armature leaves the contact 27, this circuit through the primary coil will be broken and the armature will spring back into engagement with contact 27 again. This vibrating action is so rapid that it will cause practically a continuous induced current through the neon lamps 45 so that these lamps will practically be continuously energized.

Thus it will be seen that when the vehicle is moving and the switch 28 is in the position shown in Figure 1, the lamps will be practically continuously energized but that when the vehicle comes to a stop and the switch 28 is pushed in, as for instance, by the setting of the emergency brake, the current will pass through the wheel 18, setting up a relatively slow oscillation of this wheel, which will cause the circuit through the primary of the induction coil to be closed and opened at relatively long intervals, thus causing a flashing of the neon lamps 45 as distinguished from the previously described continuous glow emitted by said lamps. The switch 47 is designed to be opened during the day and to be closed when the vehicle is travelling in the dusk or at night.

In Figures 2 to 6, we illustrate another form of mechanism designed to accomplish the same end, which is particularly compact but which operates on the same general principle. Referring to these figures, 50 designates generally an induction coil having the primary winding 51 and the secondary winding or coil 52. Attached to the casing 53 of this coil and immediately above the core 54 thereof is a wheel support 55, and mounted thereon is the metallic wheel 56 having the axle 57 which extends through the support, this wheel being provided with a metallic lug 58. The wheel is urged in a counterclockwise direction by a spring 56a. The wheel support 55 is metallic and is connected to a binding screw 59 extending through a cap 53a in turn connected by a conductor 60 to one of a pair of spaced contacts designated 61 and 62. The contact 62 is connected by a conductor 63 to a battery 64 or other source of potential and from the other side of this battery extends a conductor 65 which connects with the lower end of the primary winding 51. The other end of this primary winding connects by a conductor 66 to an armature 67 having a portion extending parallel to the casing cap 53a and attached thereto by a screw 68 or other suitable means. This armature 67 is in the form of a spring biased away from the extremity of the core 54. The free end of the armature extends upward parallel to the casing 53, then extends inward, as at 69, in the path of movement of the lug 58. The wheel 56 is urged in a counterclockwise direction by a spring 56a. One end of the secondary coil 52 is electrically connected to the conductor 66 while the opposite end is electrically connected by a conductor 71 in circuit with one or more neon lamps 72, which are connected by a conductor 73 to the wire 65 and thus to the battery 64 or other source of current. Extending from the side of the casing cap 53a is a metallic support 74 having a contact 75 disposed immediately above the upper end of the core 54 and, therefore, immediately above the armature 67. This metallic support 74 is connected by a wire 76 to a switch terminal or contact 77 having opposed to it the switch terminal or contact 78, which is connected by a wire 79 to a switch 80 to the wire 63 leading to the battery 64.

Associated with the contacts 77, 78 and 61 and 62 is the bridge 81 carried by the stem 82 and urged in a direction to carry the bridge 81 normally into engagement with the contacts 77, 78 by a spring 83. When the switch is in its normal position and the switch 80 is closed, current will pass from the battery 64 by way of the wires 63 and 79 to contact 78, thence through bridge 81 to contact 77, thence by wire 76 to the support 74, thence by contact 75 to the armature 67, thence by wire 66 through the primary coil 51, thence back to the battery, thus energizing the primary coil. As soon as the primary coil is energized, it draws downward on the armature 67, thus breaking engagement with the contact 75 and breaking the circuit through the primary coil. Immediately that the circuit is broken, the armature flies back into engagement with contact 75, the circuit is once more completed through the primary of the induction coil, the armature is again drawn downward and again the circuit is broken, and so on, causing a practically continuous illumination of the neon lamp 72. When the bridging member 81 of the control switch is shifted into engagement with the contacts 61 and 62, as for instance, by the operation of the emergency brake, a circuit will be completed from the battery 64 through the conductor 63 to contact 62 across bridge 81 to contact 61, thence to the binding screw 59 through the wheel support 55 to the wheel itself, through the lug 58 to the extremity of the armature 67, thence through the wire 66 to the primary coil and back to the battery. This will cause the armature to be drawn downward, giving a kick to the wheel 56, oscillating it in a clockwise direction against the action of the spring 56a. As soon as the lug 58 has left the armature 69, the circuit through the primary coil is broken. When the inertia of the wheel 56 has been overcome, the spring 56a returns the wheel to the position shown in Figure 2 again striking the armature and causing the circuit to be again completed through the primary coil. Obviously the breaking of the circuit through the primary coil either by passing current through the wheel or through the contact member 75 and the following closing of said circuit will cause an induced current in the lamp circuit and the intermittent or continuous flashing of the lamp 72. This induced current will flow from the secondary winding 52 through conductor 71, through the lamp 72, through conductor 73 back to conductor 65 and from thence through the primary winding to the opposite end of the secondary winding. Condensers 82 and 83 are disposed in said circuits, the condenser 82 being connected in parallel with the breaker point 75 or contact, and the condenser 83 being connected in parallel with the contact 69 and being used exclusively for the intermittent operation.

With this mechanism there is a practically continuous energization of the neon lamps when the vehicle is running and when the vehicle comes to a stop by means of the emergency brake being applied, there is an intermittent flashing of the lamps, thus giving a signal that the truck is stopped.

It will be seen that we have provided in both devices described a flasher circuit (which includes the wheel 18 or the wheel 56) for intermittently and at relatively long intervals energizing the neon lamps, and an oscillator or vibrator circuit which includes the armature 23 and contact 27 or the armature 67 and contact 75, and that we have provided a switch which selectively closes either one of these circuits.

It will be noted, of course, that the amount of current required to operate this mechanism is particularly small and that, therefore, these devices are extremely economical of current consumption and that only a relatively small storage battery is needed to be carried in order to energize these neon lamps. By the term "neon lamps" as used in the claims, we desire to include all lamps in which a gas is used and in which illumination occurs by the passage of current through this gas.

What we claim is:—

1. Means for energizing a neon lamp lighting circuit either continuously or intermittently, including an induction coil having a magnetic core, a primary winding and a secondary winding, a source of current for the primary winding, means actuated by the energization of the core constructed and arranged to intermittently close a circuit through the primary winding and the source of current at relatively long intervals and automatically break said circuit through the primary winding immediately after the core is magnetized, means disposed in a second circuit with the primary winding and the source of current and actuated by the energization of the core constructed and arranged to rapidly make and break a circuit through the primary winding and source of current, and manually controlled means for selectively preparing either of said circuits.

2. In combination, an induction coil having a primary winding, a secondary winding and an electro-magnetic core; neon lamps connected in circuit with the secondary winding; a normally open circuit including the primary winding and a magnetically attractable circuit closer disposed in the said circuit in series with the primary winding and attracted to a circuit closing position upon the energizing of the primary winding, said circuit closer being constructed and arranged to intermittently close the circuit through the primary winding at relatively long intervals to thereby cause an intermittent flashing of the neon lamps at relatively long intervals; a second normally open circuit including an oscillatable element coacting with but biased from said core but attracted by the core when the core is magnetized, said last named circuit closer being constructed and arranged to rapidly close and open the last named circuit through the primary winding to thereby cause rapid pulsations of current through the lamps to thus cause the lamps to have the appearance of being continuously lighted; and manually controllable means for selectively preparing either of said circuits.

3. In combination, an induction coil having a primary winding, a secondary winding and an electro-magnetic core; neon lamps connected in circuit with the secondary winding; an armature coacting with the core and electrically connected to the primary winding; a wheel having a lug positioned to strike the armature and shift it away from the core; a spring urging the wheel in a direction to carry the lug into engagement with the armature; the wheel and armature being connected in circuit with a source of potential and the primary winding; manually controlled means for closing said circuit to thus energize the primary winding and draw the armature in a direction to give an impulse to the wheel reverse to the impulse given to the wheel by the spring to thus break the said circuit at relatively long intervals to thereby cause an intermittent flashing of the lamps; means constructed and arranged to rapidly make and break a circuit through the primary winding to thereby cause rapid pulsations of current through the lamps whereby the lamps will appear to be continuously lighted; a second circuit including said last named means, the source of potential; and a manually controlled means for preparing said last named circuit.

4. In combination, an induction coil, including a primary winding, a secondary winding, and an electro-magnetic core; neon lamps connected in circuit with the secondary winding; electrically actuated means actuated by magnetization of the core constructed and arranged when the primary winding is energized and the core is magnetized to automatically open a circuit through the primary winding and a source of potential at regular but relatively long intervals to thereby cause a flashing of the lamp at relatively long intervals; a second electrically actuated means coacting with the core and constructed and arranged to close a circuit through the primary winding at such short intervals as will give a continuous glow to the lamps; and selective means for preparing a circuit through either one of said circuit closing means.

5. In combination, an induction coil having a primary winding, a secondary winding and a magnetic core; neon lamps connected in circuit with the secondary winding; an armature constituting a conducting member coacting with the core and resiliently biased away from the core and electrically connected to the primary winding; a rotatable electrically conductive circuit-closing element impelled in one direction by a retraction of said armature towards the core; means yieldingly urging the element into a position against the armature; means connecting the said element and the primary winding in circuit with a source of potential, whereby to secure the intermittent flashing of said neon lamps at relatively long intervals; a second electrically conductive armature coacting with the core and biased away therefrom; a contact with which the second armature coacts and with which it is normally electrically engaged; a second circuit including a source of potential, the primary winding, the second named armature and the coacting contact whereby to secure pulsations of current so rapidly through the lamps as to cause the lamps to appear to be continuously lighted; and manually controlled means for selectively preparing either of said circuits.

6. In combination, an induction coil having a primary winding, a secondary winding and a magnetic core and a source of potential connected to one end of the primary winding; neon lamps connected in circuit with the secondary winding; a spring retracted armature coacting with the core and attracted to the core when the core is magnetized, the armature being electrically connected in series with the primary winding; an electrically conductive wheel electrically connected to the source of potential and having a lug adapted to strike the armature and conduct current thereto; means urging the wheel in a direction to carry its lug into engagement with the armature and retract the armature further from the core, the energizing of the primary winding due to contact of the lug with the armature causing immediate attraction of said armature to the core and the kick-back of said wheel thereby immediately breaking the circuit through the armature and winding; a contact with which the armature electrically engages when it retracts from the core, the contact being electrically connected in a second circuit to the source of potential to thereby cause an intermittent illumination of said lamps at relatively long intervals and the opposite end of the primary winding from said armature; and selective means for closing a circuit either through the wheel, the lug, the armature, the primary winding and the source of potential or for closing a circuit through the contact, the armature, the primary winding and the source of potential to thereby cause a rapid pulsation of current through the lamps whereby the lamps appear to be continuously lighted.

OWEN M. SHATTUCK.
MURL E. FULK.